Figure 1:
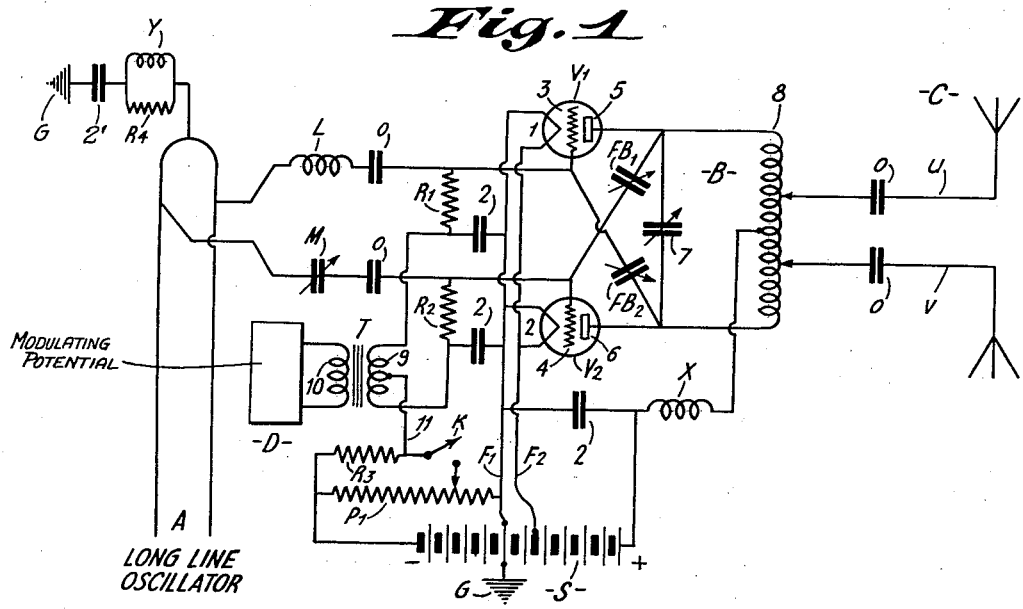

Dec. 29, 1936.  G. L. USSELMAN  2,065,842
PHASE MODULATION
Original Filed May 17, 1933

INVENTOR
GEORGE L. USSELMAN
BY
ATTORNEY

Patented Dec. 29, 1936

2,065,842

UNITED STATES PATENT OFFICE 2,065,842

PHASE MODULATION

George L. Usselman, Port Jefferson, N. Y., assignor to Radio Corporation of America, a corporation of Delaware Application May 17, 1933, Serial No. 671,431
Renewed October 15, 1935

21 Claims. (Cl. 179—171)

The present invention relates to a method of and means of producing oscillations and impressing on said oscillations variations at signal frequency. More in particular, the present invention relates to an improved method of and means for producing oscillations of the desired frequency and varying the phase of the produced oscillations at signal frequency. The phase modulated oscillations may be utilized in any manner, for example, they may be transmitted.

Systems for producing oscillations and for modulating the same in phase at signal frequency have been known heretofore in the art. In my United States application Serial No. 607,932, filed April 28, 1932, Patent No. 2,036,164, March 31, 1936, I have shown a method of and means for producing phase modulated oscillations. The means includes a separate source of high frequency oscillations connected by way of phase shifting lines to a thermionic phase modulator including a pair of thermionic tubes having their control grids connected substantially in phase to the oscillator by way of said lines and their anodes connected in parallel. In my United States application Serial No. 602,437, filed April 1, 1932, I have shown another system for producing oscillations, the phase of which varies at signal frequency. In this system the oscillations are applied from a separate source substantially in phase opposition to the control grids of a pair of thermionic tubes having their anodes connected in push-pull relation by way of a common tank circuit.

The present invention involves a method of and means for producing high frequency oscillations and for varying the phase of said oscillations at signal frequency by means of a single thermionic stage. In this respect and in others the present system differs from the systems disclosed in the applications referred to above.

In accordance with the present invention I connect the control grids of a pair of thermionic tubes to selected points on a resonant line in which sustained oscillations of the desired frequency are produced and fed back to the control grids. Sustained oscillations in this line are insured by the dimensions of the line, by the power factor of the line, and by providing coupling between the output electrodes of said tubes and said line in addition to the internal coupling in the tubes between the output and input electrodes where necessary. The output electrodes of the tubes are connected in opposition through a common tank circuit, the phase of the energy in which is determined by the relative conductivity, impedance, etc., of the tubes. The conductivity, impedance, capacity, etc., of the tubes are in turn determined by the signal frequencies which are supplied in phase opposition to the tube impedances. The signal frequencies may be applied to the control grids of the tubes, which may be triodes or any other type of tubes known today. All that is necessary is that the tubes include the necessary control elements and output elements.

The novel features of the present invention have been pointed out with particularity in the claims appended hereto.

Figure 2:
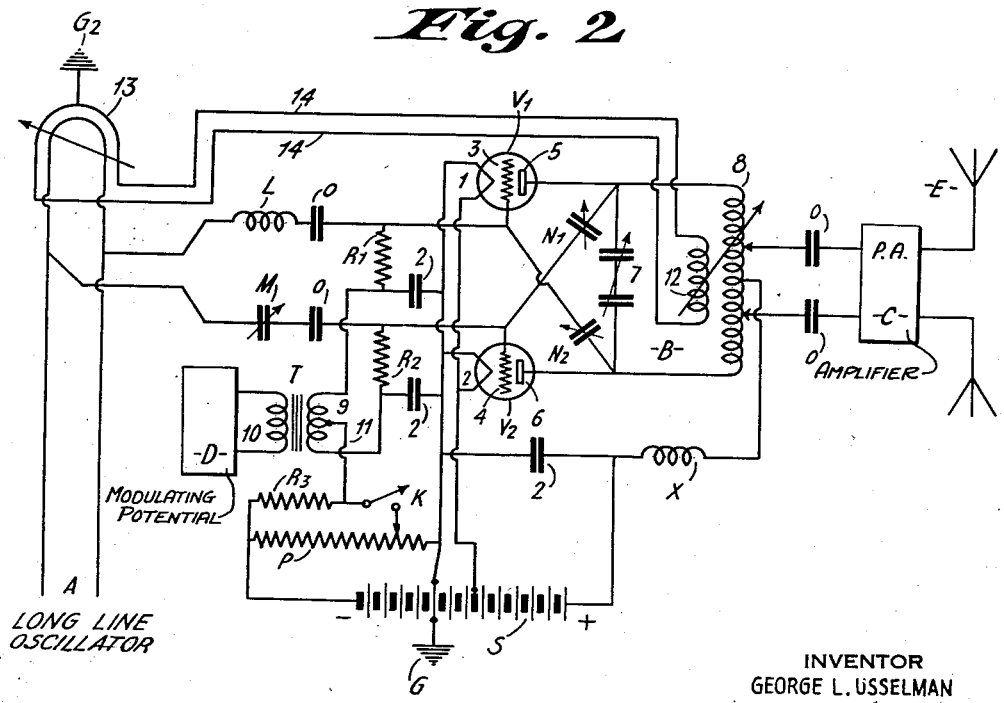

The nature of the invention and the mode of operation thereof, etc., will be better understood by the following detailed description, and therefrom when read in connection with the drawing, throughout which like reference symbols indicate like parts, and in which:

Figure 1 is a circuit diagram of an oscillation producing and phase modulating system illustrative of the present invention; while, Figure 2 shows a modification of the system of Figure 1.

In Figure 1, A represents a resonant line, one end of which is open, as shown, and the other end of which may be short-circuited and connected to ground G by way of an impedance device including an inductance Y shunted by a resistance $R_4$ and a series by-pass capacity $2'$. The impedance device Y, $R_4$ is desirable in some cases to prevent parasitic oscillations from appearing in the line. This line A, including the two conductors, should be in length, for best results, an odd number of quarter wave lengths of the desired operating frequency. At some suitable distance from short-circuited and grounded end of line A, I connect, as shown, two phase shifting elements L and M. The element L may be inductive in nature, while the element M may be capacitive in nature. The ends of elements M and L remote from the line A are connected, as shown, through blocking condensers O to the grid electrodes 3 and 4 of a pair of thermionic tubes $V_1$, $V_2$ in phase opposition, as shown, and to the ends of $R_1$ and $R_2$ respectively, as shown. The other ends of resistors $R_1$ and $R_2$ are connected to the secondary winding 9 of a transformer T and are grounded for radio frequency currents by way of the radio frequency by-pass condensers 2 to the filament lead $F_1$ of leads $F_1$, $F_2$ which are connected with the filaments 1 and 2 of the tubes $V_1$ and $V_2$ and with a portion of the source of power S. Negative bias is supplied to the grids 3 and 4 of tubes $V_1$ and $V_2$, respectively, by way of the resistors $R_1$ and $R_2$, the halves of the secondary winding of transformer T and the lead 11 which is connected to potentiometer P1 by way of a resistance R3 or key K, as shown. The elements and source 3 are so chosen that when key K is in the open position the control grids of tubes V1, V2 are biased to a point at which oscillations are stopped or nearly stopped. The cathodes or filaments of tubes V1, V2 are maintained at ground potential by connecting the lead F1 to the battery S and to ground G. Modulating potentials from a source D may be impressed on the primary winding of transformer T.

The anodes 5 and 6 of tubes V1, V2 are connected in push-pull or phase opposition to tank circuit B, as shown. The tank circuit B includes an inductance 8 and a variable tuning capacity 7 in parallel. The anode 5 of tube V1 is connected by way of a feed-back condenser FB1 to the control grid 4 of tube V2, while the anode 6 of tube V2 is connected by way of a feed-back condenser FB2 to the control grid 3 of tube V1. In some cases the feed-back through the capacity between the tube elements is sufficient, in which case the condensers FB1, FB2 may be smaller than the capacities between the tube elements. Space current for the anodes 5 and 6 of tubes V1, V2 is supplied by way of the mid-tap of inductance 8 and radio frequency choking inductance X from the positive terminal of the source S. The inductance X prevents parasitic push-pull oscillations from being set up in the tubes and circuits including the anodes. Radio frequency oscillations appearing in the tank circuit B, which may get through the choking inductance X, are shunted from the source S by way of a by-passing condenser 2 connected, as shown, between X and the filament lead F1.

In practice the line A has a very low power factor and said line operates with a comparatively high volt high amperage in it. The line A is, as stated before, of a length equal to an odd number of quarter lengths of the desired operating frequency. The line A is, as shown, connected to the control grids of tubes V1, V2 and the control grids of tubes V1, V2 are connected by way of feed-back condensers to the anodes of tubes V2, V1, respectively, so that a fly wheel effect is produced in said tubes and said circuits. The tubes feed energy to the line continuously to maintain the line current in a state of oscillation. The values of the condensers FB1 and FB2, which are adjustable, are selected to feed the desired amount of energy to the line A. The oscillations in the line in turn feed energy to the control grids of the tubes so that the fly wheel effect, that is, the feeding of energy between the line and the tubes and the tubes and the line, is continuous. The excitation energy received by grid 3 passes through the inductive element L which retards the energy so that the energy fed to the control grid 3 is lagging in phase with respect to the energy in the line A. Consequently, the energy fed by the anode 5 to the tank circuit B will be lagging in phase with respect to the current in the line A. The excitation energy fed by the line A to the grid 4 of tube V2 passes through the capacitive element M, which advances the phase of the energy fed to the grid 4 of tube V2. Consequently, the energy fed from the anode 6 of tube V2 to tank circuit B is always leading in phase with respect to the energy in the line A and in the tube V1. The oscillations in line A assume an average phase position if the modulating frequencies on the grids 3 and 4 are not too low. When tubes V1, V2 have equal bias, that is, when there are no modulating voltages present in the source D, these tubes feed equal amounts of energy to tank circuit B so that the tank circuit B and line A oscillate with constant phase rotation.

Now assume that signal frequencies are present in the source D and are supplied to the primary winding 10 of transformer T. These signal frequencies will be applied in phase opposition by way of the secondary winding 9 to the control grids 3 and 4 of the tubes V1, V2 respectively. The bias on grids 3 and 4 will be modulated in phase opposition by the current in the secondary winding 9 of transformer T and resistors R1 and R2, respectively. If we take an instant in the modulation cycle when grid 3 is maximum positive and grid 4 is minimum negative, the energy of tube V1, which is of lagging phase, will predominate in tank circuit B and the phase of the transmitter output energy will be lagging. In the next half cycle of the modulation frequency the energy from tube V2, which is leading in phase, will predominate in the tank circuit B and this time the transmitter output energy will be leading in phase. In this way the signal frequency appears in the transmitted or radiated energy as phase modulation of the carrier frequency.

If the characteristics of the lines including the reactances L and M and the resistances R1 and R2 are maintained equal, except in their phase retarding or phase advancing characteristics, each tube, V1, V2, will supply in turn equal amounts of energy to the tank circuit so that the phase of the energy in the tank circuit will shift with respect to a mean phase position between limits which can be determined by predetermining the retarding and advancing effect of the reactances L and M on the currents supplied to the control grids of tubes V1, V2. The phase of the oscillations in the tank circuit will change to approach the phase of the energy delivered from that tube having the lower effective grid bias and therefore supplying the most power to the tank circuit. For example, when maximum negative bias is on the control grid of one tube and minimum negative or positive bias on the grid of the other tube, the phase of the energy in the tank circuit will approach the phase of the energy delivered thereto by the latter tube. Obviously, the phase of the energy in the tank circuit will shift about a mean phase position at a rate dependent upon the frequency of the modulating currents and to an extent dependent upon the amplitude of the modulating currents limited by the initial phase shift produced by the phase shifting elements L and M.

If the signals in D are speech frequencies or other intelligible voltages, the key K is closed. The high frequency oscillations produced in A, V1, V2, etc., are modulated in phase in accordance with said frequencies and may be utilized in any manner, for example, they may be limited, frequency multiplied, amplified, etc., and radiated. In other words, telephony signals may be produced.

If it is desired to use the system to telegraph, the key K may be manipulated directly or by way of a relay to key the oscillations produced in A and V1, V2. In this case to obtain the advantages of phase modulation transmission, i. e., the increased efficiency, the effect of frequency diversity, etc., the oscillations may be phase modulated by a modulating frequency from D, as described hereinbefore. In this case phase modulated oscillations key at signal frequency, are produced, and may be utilized in a manner known in the art today.

While I have shown my system as utilizing thermionic tubes of the triode type, it will be understood that my invention is not limited to the use of such tubes. Obviously, other tubes, as, for example, tubes of the screen grid type or pentode type, may be used. Furthermore, when such tubes are used, the modulating potentials may be applied to the control grids or to the anodes or to the screen grid electrodes in said tubes rather than to the control grids, as shown in the circuit which illustrates the invention. Furthermore, feed-back, in addition to the internal coupling between electrodes in the tubes, may be provided in a manner different than shown. For example, the feed-back energy may be supplied by way of the auxiliary electrodes.

The phase modulated oscillations appearing in tank circuit B may be amplified or frequency multiplied, or both, and supplied to a load circuit, or may be supplied directly to a load circuit, as, for example, an aerial by way of blocking condensers O and lines U and V, as shown in Figure 1.

Under some circumstances, the system as shown in Figure 1 may not be efficient enough due to radio frequency losses in the resistors $R_1$, $R_2$ and elements L and M, through which energy is fed back to the oscillating line A and from the oscillating line A to the control grids of the tube.

Where more efficient operation is necessary, a system as illustrated in Figure 2 may be used. The system in Figure 2 is, in many respects, similar to the system in Figure 1 and a detailed description of the system of Figure 2 is deemed unnecessary.

Figure 2 differs from Figure 1 in several respects. The transmitter in Figure 2 is equipped with a power amplifier PA so that the phase modulated oscillations may be amplified before they are fed to the load circuit E. Moreover, the feed-back condensers $FB_1$ and $FB_2$ of Figure 1 have in this arrangement been replaced by neutralizing condensers $N_1$ and $N_2$, as shown. Since the tubes $V_1$, $V_2$ in this arrangement are neutralized, other means for producing feed-back between the resonant line A and the tubes $V_1$, $V_2$ is provided to insure continued oscillation of the currents in the line A. Excitation voltage is supplied to line A by way of an inductance 12 coupled to inductance 8 in tank circuit B and connected by lines 14 to an inductance or conductor coupled at 13 to the short-circuited end of line A. This coupling should be variable in order that the amount of energy fed back may be adjusted. Likewise, the coupling between 12 and 8 should be adjustable and the coupling should be of proper phase relation to obtain maximum oscillation efficiency in the line A.

In some cases it may be necessary to ground the midpoint of the inductance 13, as shown. In the system of Figure 1 it was found necessary to ground the electrical center or midpoint of the line A by way of the impedance combination Y, $R_4$, as shown. In the system of Figure 2 it may be desirable to leave the electrical center of the line A ungrounded. In both systems the line A must be of very low power factor and its circulating volt-amperes must be large so that the fly wheel action maintained between the tubes $V_1$ and $V_2$ and line A is of large amplitude and sustained.

The oscillations are produced in the system of Figure 2 and modulated in the same manner in which they are produced in Figure 1 and a description thereof is thought unnecessary at this point.

As has been brought out in my United States application Serial No. 602,487, filed April 1, 1932, the phase modulating oscillations produced by a system as described herein are more efficient since their transmission range is greater for the power expended than other types of modulation. The phase modulated oscillations may in both systems be keyed at signal frequency by manipulating the key K. In this manner phase modulated oscillations keyed at signal frequency are produced and may be amplified in the power amplifier PA and radiated.

Having thus described my invention and the operation thereof, what I claim is:

1. The combination of a resonant line of substantially zero power factor, a pair of thermionic tubes each having a control grid and anode circuits for applying energy of unlike phase from said line to said grids, a circuit for connecting the anodes of said tubes in push-pull and coupling the same to their control grids, and a source of modulating potential connected in phase opposition to the control grids of said tubes.

2. The combination of a resonant line, a pair of thermionic tubes having their control grids connected through phase shifting elements of different character to said line, their anodes connected to a tank circuit and coupled to said line, and a source of modulating potential connected in phase opposition to the control grids of said tubes.

3. Means for producing modulated oscillations comprising, a resonant line, the length of which is an odd number of quarter wave lengths long, a pair of thermionic tubes having their control grids energized out of phase by energy from said line, their anodes connected in push-pull to a tank circuit, and means for varying the amount of energy supplied by each tube to said tank circuit including a source of modulating potential connected to the control grids of said tubes.

4. A device for producing high frequency oscillations, for modulating the same in phase and for keying the modulated waves at signal frequency comprising, a resonant line of an odd number of quarter wave lengths, a pair of thermionic tubes, inductive means connecting the control grid of one of said tubes to one side of said resonant line, capacitive means connecting the control grid of the other of said tubes to the other side of said line, a tank circuit connected between the anode electrodes of said tubes, capacitive means connecting the anode of one tube to the control grid of the other tube, capacitive means connecting the anode of the last tube to the control grid of the first tube, a load circuit coupled to said tank circuit, a source of modulating potential connected to the control grids of said tubes, and a key connected to the control grids of said tubes.

5. Apparatus for producing high frequency oscillations and for modulating the same in phase comprising, a resonant line of an odd number of quarter wave lengths, a pair of thermionic tubes, phase shifting means connecting the control grid of one of said tubes to one side of said resonant line, phase shifting means connecting the control grid of the other of said tubes to the other side of said line, a tank circuit connected between the anode electrodes of said tubes, a load circuit coupled to said tank circuit, and a source of modulating potential connected to the control grids of said tubes.

6. Means for producing high frequency oscillations and for modulating the same in phase at signal frequency comprising, a resonant line of an odd number of quarter wave lengths, a pair of thermionic tubes, inductive means connecting the control grid of one of said tubes to one side of said resonant line, capacitive means connecting the control grid of the other of said tubes to the other side of said line, a tank circuit connecting the anodes of said tubes in phase opposition, capacitive means connecting the anode of one tube to the control grid of the other tube, capacitive means connecting the anode of the last tube to the control grid of the first tube, a load circuit coupled to said tank circuit, and a source of modulating potential connected to the control grids of said tubes.

7. A device for producing high frequency oscillations comprising, a resonant line, the length of which is an odd number of quarter wave lengths of the frequency it is desired to produce, a pair of thermionic tubes, phase shifting means connecting the control grid of one of said tubes to one side of said line, phase shifting means connecting the control grid of the other of said tubes to the other side of said line, a tank circuit connecting the anodes of said tubes in phase opposition, a coupling between said tank circuit and said resonant line, and means for modulating the phase of the oscillations produced comprising a source of modulating frequencies connected in phase opposition to the control grids of said tubes.

8. Means for producing high frequency oscillations and for modulating the same in phase and for keying the phase modulated oscillations comprising, a long line oscillator, the length of said line being an odd number of quarter wave lengths of the desired oscillations, a pair of thermionic tubes having anode, cathode and control electrodes, an inductance connecting the control electrode of one of said tubes to one side of said line, a capacity connecting the control electrode of the other of said tubes to the other side of said line, a connection between a point on said line and the cathodes of said tubes, a tank circuit including an inductance connecting the anodes of said tubes in phase opposition, capacitive means connecting the anode of one of said tubes to the control grid of the other of said tubes and the anode of said last named tube to the control grid of said first named tube, an inductance coupled to the inductance of said tank circuit and connected to an inductance coupled to said line, both of said couplings being variable, a source of modulating potentials, a circuit for connecting said source in phase opposition to the control grids of said tubes, and a source of direct current potential connected by way of a key between the control grids and cathodes of said tubes.

9. The combination of a resonant line, a pair of thermionic tubes having their input electrodes connected through phase shifting elements of unlike character to different points on said line, their output electrodes connected to a tank circuit and coupled to said line, and a circuit for varying the impedance of said tubes in phase opposition at signal frequency.

10. Means for producing oscillations of a desired frequency comprising, a resonant line an odd number of quarter wave lengths long, a pair of thermionic tubes having their input electrodes connected to points on said line, their output electrodes connected in push-pull relation to a tank circuit, a circuit for varying the impedance of said tubes alternately at signal frequency to produce phase wobbling of said oscillations, and a keying circuit associated with said last named circuit.

11. A signalling system for producing high frequency oscillations and for modulating the same in phase comprising, a resonant line of an odd number of quarter wave lengths, a pair of thermionic tubes, phase shifting means connecting the control grid of one of said tubes to one side of said resonant line, phase shifting means connecting the control grid of the other of said tubes to the other side of said line, a tank circuit connected between the anode electrodes of said tubes, a load circuit coupled to said tank circuit, a circuit for varying the impedances of said tubes alternately at a modulating frequency, and keying means for applying different values of direct current bias to the control grids of said tubes.

12. Means for producing high frequency oscillations and for modulating the same in phase at signal frequency comprising, a resonant line of an odd number of quarter wave lengths, a pair of thermionic tubes, inductive means connecting the control grid of one of said tubes to one side of said resonant line, capacitive means connecting the control grid of the other of said tubes to the other side of said line, a tank circuit connecting the anodes of said tubes in phase opposition, capacitive means connecting the anode of one tube to the control grid of the other tube, capacitive means connecting the anode of the last tube to the control grid of the first tube, a load circuit coupled to said tank circuit, a circuit for applying modulating potentials in phase opposition to the impedances of said tubes, and a source of direct current connected by way of a key shunted by a resistance between the grids and cathodes of said tubes.

13. A telegraphy or telephony system including the combination of, a line having uniformly distributed inductance and capacity, a pair of thermionic tubes having their control grids connected to points on said line by way of phase shifting elements of different character, a source of modulating potentials connected in phase opposition to the control grids of said tubes, a source of direct current connected between the control grids and cathode of said tubes by way of a resistance, said source applying negative potential to the control grids of said tubes of such a value as to substantially block the flow of current in said tubes, and means for decreasing the negative potential on the grids of said tubes comprising a second resistance in parallel with said source and a key connecting a point on said last named resistance to a point on said first named resistance.

14. A device for producing high frequency oscillations and for modulating the same in phase at signal frequency comprising, a resonant line having uniformly distributed inductance and capacity, a pair of thermionic tubes each having an anode and a control grid, phase shifting means connecting the control grid of one of said tubes to a point on said line, phase shifting means connecting the control grid of the other of said tubes to another point on said line, a tank circuit connected to the anodes of said tubes, and a circuit for applying modulating potentials to the control grids of each of said tubes.

15. Means for producing high frequency oscillations and for modulating the same in phase at signal frequency comprising, a U shaped line having distributed inductance and capacity, a pair of thermionic tubes each having an anode and a control grid, inductive means connecting the control grid of one of said tubes to a point on said line, capacitive means connecting the control grid of the other of said tubes to a point on said line, a circuit connected to the anode of both of said tubes, a coupling between the anode of one tube and the control grid of the other tube, a coupling between the anode of the last tube and the control grid of the first tube, and a circuit for varying the internal impedances of said tubes at modulation frequency.

16. Means for producing high frequency oscillations and for modulating the same in phase and for keying the phase modulated oscillations comprising, a U shaped line having uniformly distributed capacity and inductance and a low power factor, a pair of thermionic tubes having anode, cathode and control grid electrodes, an inductive reactance connecting the control electrode of one tube to a point on said line, a capacitive reactance connecting the control grid of the other of said tubes to a point on said line, a connection between said line and the cathodes of said tubes, a tank circuit connected to the anodes of said tubes, variable capacitive means regeneratively coupling the anode of one of said tubes to the control grid of the other of said tubes and the anode of said last named tube to the control grid of said first named tube, a source of modulating potentials, a circuit for connecting said source of modulating potentials in phase opposition to the control grids of said tubes, and a source of direct current potential connected by way of a key with the cathodes and control grids of said tubes.

17. Apparatus for producing high frequency oscillations and for modulating the same in phase comprising, a resonant line of an odd number of quarter wave lengths, a pair of thermionic tubes each having a control electrode and an anode, phase shifting means connecting the control electrode of one of said tubes to one side of said resonant line, a circuit connecting the control electrode of the other of said tubes to the other side of said line, an output circuit connected with the anodes of said tubes, and a circuit for varying the internal conductivity of said tubes in phase opposition and signal frequency.

18. In a high frequency system, a pair of vacuum tubes each having cathode, control grid and anode electrodes, a low power factor circuit, a pair of phase shifting elements of different character, connections connecting one of said phase shifting elements to a point on said low power factor circuit and to the control grid electrode of one of said tubes, connections connecting the other of said phase shifting elements to a point of different alternating current polarity on said low power factor circuit and to the control grid electrode of said other tube, said low power factor circuit and tubes cooperating to produce high frequency oscillations, a tank circuit connected to the anode and cathode electrodes of said tubes, a source of modulating potential, and means coupling said source to electrodes of said tubes for instantaneously oppositely varying the conductivity of said tubes.

19. A system for producing modulated high frequency oscillations comprising a low power factor circuit having inductance and capacity and being adapted to carry large circulating currents so as to have a flywheel effect, a pair of thermionic tubes connected through phase shifting elements of unlike character to different points on said low power factor circuit, a tank circuit coupled to output electrodes of said tubes, said tank circuit being coupled for high frequency currents to said low power factor circuit, and another circuit for varying the impedance of said tubes in phase opposition at signal frequency.

20. A system for producing phase modulated high frequency oscillations comprising a low power factor circuit adapted to carry large circulating currents, a pair of thermionic tubes each having an anode and a control grid, phase shifting means connecting the control grid of one of said tubes to a point on said low power factor circuit, phase shifting means of different character connecting the control grid of the other of said tubes to a point of different alternating current polarity on said low power factor circuit, a tank circuit connected to the anodes of said tubes, and a separate circuit for applying modulating potentials to the control grids of each of said tubes.

21. In a system for producing phase modulated high frequency oscillations, a circuit adapted to carry circulating oscillatory energy many times greater than the energy dissipated in said circuit per cycle of said energy, a pair of thermionic tubes each having an anode, a cathode and a control grid, an output circuit connected to the anodes of said tubes and to the cathodes of said tubes, a phase advancing element connecting a point on said first mentioned circuit to the control grid of one of said tubes, a phase retarding element connecting another point on said first mentioned circuit to the control grid of the other of said tubes, an impedance connecting an additional point on said first mentioned circuit to the cathodes of said tubes, and a circuit for applying modulating potentials in phase opposition to the control grids of said tubes.

GEORGE L. USSELMAN.